United States Patent
Dold et al.

(10) Patent No.: US 7,412,293 B2
(45) Date of Patent: Aug. 12, 2008

(54) PROCESS CONTROL

(75) Inventors: Franz Dold, Furtwangen (DE); Irina Hippenmeyer, Denzlingen (DE); Craig Kendall, Farmington, MN (US); Jim O'Laughlin, Belle Plaine, MN (US)

(73) Assignee: Sick AG, Waldkirch/Breisgau (DE)

( * ) Notice: Subject to any disclaimer, the term of this patent is extended or adjusted under 35 U.S.C. 154(b) by 249 days.

(21) Appl. No.: 11/104,895

(22) Filed: Apr. 13, 2005

(65) Prior Publication Data

US 2005/0234567 A1 Oct. 20, 2005

(30) Foreign Application Priority Data

Apr. 16, 2004 (DE) .................. 10 2004 018 642

(51) Int. Cl.
*G05B 9/02* (2006.01)
*G05B 19/18* (2006.01)
*G05B 11/01* (2006.01)
*G06F 17/00* (2006.01)

(52) U.S. Cl. .................. 700/79; 700/3; 700/21; 700/90

(58) Field of Classification Search .................. 700/79, 700/3, 21, 90
See application file for complete search history.

(56) References Cited

U.S. PATENT DOCUMENTS

| | | | | |
|---|---|---|---|---|
| 5,526,264 | A * | 6/1996 | Niggemann et al. ........... 701/76 |
| 6,370,438 | B1 | 4/2002 | Rocchia et al. |
| 6,837,363 | B2 * | 1/2005 | Munzebrock et al. ..... 198/502.1 |
| 7,269,465 | B2 * | 9/2007 | Esch et al. ................. 700/21 |
| 2001/0049564 | A1 | 12/2001 | Barthel et al. |
| 2002/0083246 | A1 * | 6/2002 | Rupp et al. ................. 710/107 |
| 2002/0093951 | A1 | 7/2002 | Rupp et al. |
| 2002/0113701 | A1 * | 8/2002 | Turk .......................... 340/542 |
| 2002/0126620 | A1 | 9/2002 | Heckel et al. |

FOREIGN PATENT DOCUMENTS

| | | |
|---|---|---|
| DE | 19734589 A1 | 8/1997 |
| DE | 29923430 U1 | 2/1999 |
| DE | 19922561 A1 | 5/1999 |
| DE | 19939567 A1 | 8/1999 |
| DE | 199 22 561 A1 | 11/2000 |
| DE | 199 25 693 A1 | 12/2000 |
| DE | 199 28 517 C2 | 1/2001 |

(Continued)

*Primary Examiner*—Albert DeCady
*Assistant Examiner*—Thomas H Stevens
(74) *Attorney, Agent, or Firm*—Harness, Dickey & Pierce, P.L.C.

(57) ABSTRACT

The invention relates to a method for process control, wherein at least one process device to be controlled is controlled by at least one process module and by at least one safety module, in that process signals not relevant to safety are transmitted to a local control unit associated with the process device by the process module and safety signals relating to the process safety are transmitted by the safety module, wherein the process signals and the safety signals are logically linked to one another in the control unit and the result of the logical link is made available at a control output of the control unit to which the process device to be controlled is connected.

The invention moreover relates to a system for process control, in particular for the carrying out of the method in accordance with the invention.

17 Claims, 4 Drawing Sheets

FOREIGN PATENT DOCUMENTS

| | | |
|---|---|---|
| DE | 10240584 A1 | 8/2002 |
| DE | 10330916 A1 | 4/2003 |
| DE | 102 01 212 A1 | 7/2003 |
| DE | 102 11 938 A1 | 10/2003 |
| DE | 102 11 939 A1 | 10/2003 |
| EP | 1054309 A2 | 4/2000 |

* cited by examiner

PROCESS CONTROL

CROSS-REFERENCE TO RELATED APPLICATIONS

This application claims the benefit of German Application No. 10 2004 018 642.1 filed Apr. 16, 2004. The disclosure of the above application is incorporated herein by reference.

FIELD OF THE INVENTION

The invention relates to a method and to a system for process control.

BACKGROUND OF THE INVENTION

In many applications of automation and process engineering, not only does the process control have to control the actual working process, but safety aspects must also be taken into account. In the control of process devices, for example actuators, a combination of process data and safety data or a combination of the corresponding signals is, for example, necessary when movements of a machine part driven by an actuator which are critical to safety or which are dangerous for persons or also for capital goods should both be controlled by the actual process control and also switched off by the safety control in a case of emergency or disturbance.

Different methods for the combination of the process control with the safety control are already known.

In accordance with one method, the process control and the safety control are separate from one another: the control of the actual working process of the process device takes place by the process control. In the case of a fault, the safety control switches the voltage supply of the process device off independently of the process control, whereby the process device runs out in an uncontrolled manner. There are improved solutions in which actuators with so-called integrated safety are used which have separate switch inputs for the process control, on the one hand, and for the safety control, on the other hand.

In accordance with a further known method, the process logic, on the one hand, and the safety logic, on the other hand, are combined with one another in the safety control. The process data and the safety data are taken into account in the safety control in this process, with only a resulting signal being communicated to the process device to be controlled. The required exchange of data between the process control and the safety control is disadvantageous in this process. In practice, field bus systems are increasingly used such that, when this known method is used, a common communication protocol has to be implemented both in the process control and in the safety control.

A further known method proposes that the data stream from the process control to the process device be monitored by the safety control. As with the known methods described above, it is, however, disadvantageous here that the data of the process control have to be taken into account in the safety program of the safety control. Not only the calculation effort in the safety control is hereby increased, but a communication relationship between the process control and the safety control is moreover required.

It is furthermore problematic that the data exchange of process data and safety data is frequently critical, since there is the risk that, in particular due to the inexperience of the user, only unsafe input signals of the process control, which are not securely recorded, are used for safety functions. For example, a configuration can thus be accidentally realized in which a signal corresponding to an "emergency off" is read in at an unsafe input module and a dangerous movement of an actuator is hereby controlled due to the exchange of data in the safety control. This represents a non-acceptable interruption of the safety chain for the practical application.

Reference is generally made in another respect to DE 199 28 517 C2, DE 199 25 693 A1, DE 102 01 212 A1, DE 102 11 939 A1, DE 102 11 938 A1 and DE 199 22 561 A1 with respect to the prior art.

SUMMARY OF THE INVENTION

It is the object of the invention to make process controls as safe as possible in a manner which is as simple and as cost-favorable as possible.

This object is first satisfied by the features of the independent method claim 1 and in particular in that at least one process device to be controlled is controlled by at least one process module and at least one safety module, in that non-safety relevant process signals are communicated to a local control unit associated with the process device by the process module and safety signals relating to the process safety are communicated to said local control unit by the safety module, with the process signals and the safety signals being logically linked to one another in the control unit and the result of the logical link being provided at a control output of the control unit to which the process device to be controlled is connected.

The object underlying the invention is secondly satisfied by the features of the independent apparatus claim and in particular in that the process control system includes at least one process device to be controlled, at least one process module and at least one safety module, with the process device being connected to the control output of a local control unit associated with the process device, the control unit having at least one signal input for non-safety relevant process signals of the process module and for safety signals of the safety module relating to the process safety and the control unit including a logic module which is connected between the signal input and the control output and in which the process signals and the safety signals can be logically linked to one another and from which the result of the logical link can be provided at the control output.

In accordance with the invention, a local control unit which is made for the logical linking of the process signals and the safety signals is provided for the process device to be controlled, e.g. an actuator. The control unit processes the process signals and the safety signals and provides the result of the logical link at its control output to which the actuator is connected. The control output of the control unit is consequently a safety-directed output which is controlled while taking account of the unsafe process signals which are also designated standard signals.

By the provision in accordance with the invention of the local control unit, an advantageous decentralization of the process control is achieved which in particular manages with a lower number of components. The logic of the control is so-to-say transposed into the decentralized, local control unit by the linking of the process signals with the safety signals. A monitoring for coincidence of process control and safety control can in particular take place in the local control unit by the logical linking of the process signals and the safety signals, whereby a particularly high degree of safety is achieved. It is furthermore of advantage that existing plants can be retrofitted simply by the installation of the control unit in accordance with the invention, and indeed while maintaining the existing modules for the process and safety control.

With respect to safety, the method in accordance with the invention and the system in accordance with the invention can be realized either in a so-called local design or in a so-called remote design in the local variant, the safety module is directly connected to the control unit and is in particular arranged in the region of the control unit and thus of the process device to be controlled. In the remote variant, the safety module—like the process module—is connected to the control unit via a common communication system, in particular in the form of a field bus system.

It is advantageous in accordance with the invention, in particular with the remote variant, that no communication relationship has to take place between the safety control and the process control for the linking of the process data with the safety data in the local control unit. Furthermore, no increased calculating power has to be kept available in the safety control for the logical linking of the signals. This makes it possible to offer the user a solution optimized with respect to the costs and to the performance.

It is furthermore of advantage that any errors which occur at the control output of the control unit can be simultaneously reported to the safety control and to the process control due to the two existing communication relationships between the control unit, on the one hand, and the safety control and the process control, on the other hand. It is in particular not necessary to carry an error diagnosis through from the control unit via the safety control to the process control.

In particular with the local variant, in which the safety module is directly linked to the control unit, it is of advantage for the process control to be able to access the error-safe control output of the control unit without further safety components having to be integrated into the existing communication system, in particular a field bus system, via which the process control communicates with the local control unit. A corresponding bus module can in particular be integrated into an existing, non-safe field bus system.

Since no additional safety control is required in the process system in addition to the safety module directly connected to the control unit, substantial cost savings result for the user. A local safety input for the safety module provided at the local control unit can directly control the local safe control output of the control unit while taking account of the process signals.

Further preferred embodiments of the invention are recited in the dependent claims, in the description and in the drawing.

In accordance with an embodiment of the invention, at least one safety signal, which is logically linked to the process signals, is thus itself formed by a logical linking of safety signals relating to the process safety. A decentralized safety control, which can generally be made as complex as desired, can hereby be realized with the help of the local control unit.

A particularly high degree of safety is achieved when, in accordance with a further embodiment of the invention, the logical link between the process signals and the safety signals are designed such that a discrepant signal input pattern has the consequence of a remaining of the control output in a safe state.

The logical link between the process signals and the safety signals is preferably designed as a logical AND link.

Accordingly, the logical link of these safety signals is preferably designed as a logical AND link for the case that the safety signal to be linked to the process signals is itself formed by a logical link of safety signals relating to the process safety.

Generally, however, the logical link can adopt any desired form.

As already initially indicated, in a preferred embodiment of the process control system in accordance with the invention, at least the process module is connected to the local control unit via a field bus system.

In the remote variant discussed above, the process module and the safety module are preferably arranged remote from the control unit and are connected to the control unit via a common communication system, in particular a field bus system.

Provision is preferably made in the local variant likewise already addressed above for the process module to be arranged remote from the control unit and to be connected to the control unit via a central communication system, in particular via a field bus system, and for the safety module to be arranged locally in the region of the control unit and in particular to be arranged remote from the process module and to be directly connected to the control unit.

The process module is preferably provided in the form of an MPC (memory programmable control—known in Germany as "SPS").

The safety module is preferably provided in the form of a safety sensor, but can generally also include a safety control, in particular in the form of an MPC.

As already indicated above with respect to the process control method in accordance with the invention, the control unit in accordance with a further embodiment of the invention can include a plurality of safety inputs for safety signals which can be logically linked to one another by means of the logic module of the control unit to form a resulting safety signal, with the resulting safety signal in turn being able to be logically linked to the process signals.

For a further increase in the safety, provision is preferably made for a plurality of channels, in particular two channels, to be provided in the control unit for at least one process device to be controlled, in particular for every process device to be controlled, said channels each being made for the logical linking of process signals and safety signals. Each channel can be made as an independent safety switch-off path so that a plurality of independent switch-off paths, in particular two such paths, are present for each process device to be controlled.

In accordance with a further embodiment of the invention, a third independent safety switch-off path can be realized in that the voltage supply for the control output of the control unit is provided separately from the logical signal path and/or from the voltage supply of the process device. In this manner, an additional possibility is provided to safely close down the control output.

Provision can furthermore be made in accordance with the invention for the process signals to be supplied to the control unit alternatively or additionally via local safety inputs and/or local signal inputs not directed to safety. The process data not directed to safety can therefore also be read in and linked by the local safety inputs or the signal inputs not directed to safety of the local control unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

If nothing else is recited, in the following, the terms starting with "process" such as process control, process data and process signals, have the meaning that there is no direct relation to safety aspects, i.e. the process control only relates to the actual working process and the process signals and/or process data do not contain any safety signals or safety data, but only represent so-called unsafe signals or data. It must still be remarked that the term "standard" is also used instead of the term "process" in practice to distinguish between the "process world" and the "safety world".

Figure 1:
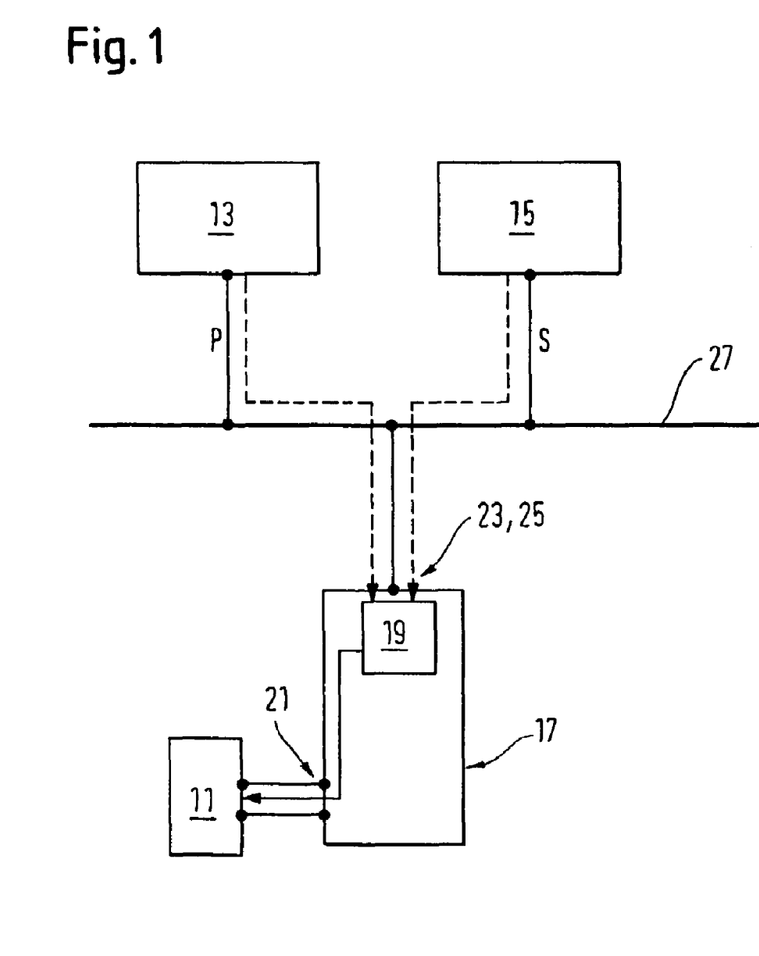
FIG. 1 shows schematically, a section from a process control system in accordance with the invention in a remote variant.

In the remote variant in accordance with FIG. 1, a process MPC 13 and a safety MPC 15 communicate via a field bus system 27 with a control unit 17 which is connected to the field bus 27 via signal inputs 23, 25 and which has control outputs 21 directed to safety for process devices 11 to be controlled. The process devices 11 to be controlled can, for example, be actuators or motors of processing machines which carry out movements which can be dangerous to persons or also to capital goods under certain circumstances. To prevent such procedures critical for safety, the safety MPC 15 is provided, whereas the process MPC 13 controls the actual working process independent of safety aspects.

FIG. 1 only shows a control unit 17 to which only a process device 11 has been connected. Generally, the process control 13 and the safety control 15 can control any desired number of control units 17 connected to the field bus system 27 and thus any number of process devices 11. It is furthermore generally possible for a plurality of process devices 11 to be connected to a control unit 17. In this case, the control unit 17 is provided with a plurality of control outputs 21 directed to safety.

It is indicated by the signal paths shown by broken lines in FIG. 1 that the provision of a central communication system such as the field bus system 27 is not absolutely necessary for the invention, but that the process control 13 and the safety control 15 can also communicate directly with the control unit 17 which is in this case equipped with corresponding signal outputs.

The control unit 17, which is arranged locally, and thus in a decentralized manner, in the region of the process device 11 to be controlled in each case, has a logic module 19 in which the process signals P coming from the process MPC 13 and the safety signals S coming from the safety MPC 15 are processed, which will be looked at in more detail in the following. The logic module makes safe control signals for the respective process device 11 available at the control output 21 of the control unit 17 as the result of this signal processing.

Figure 2:
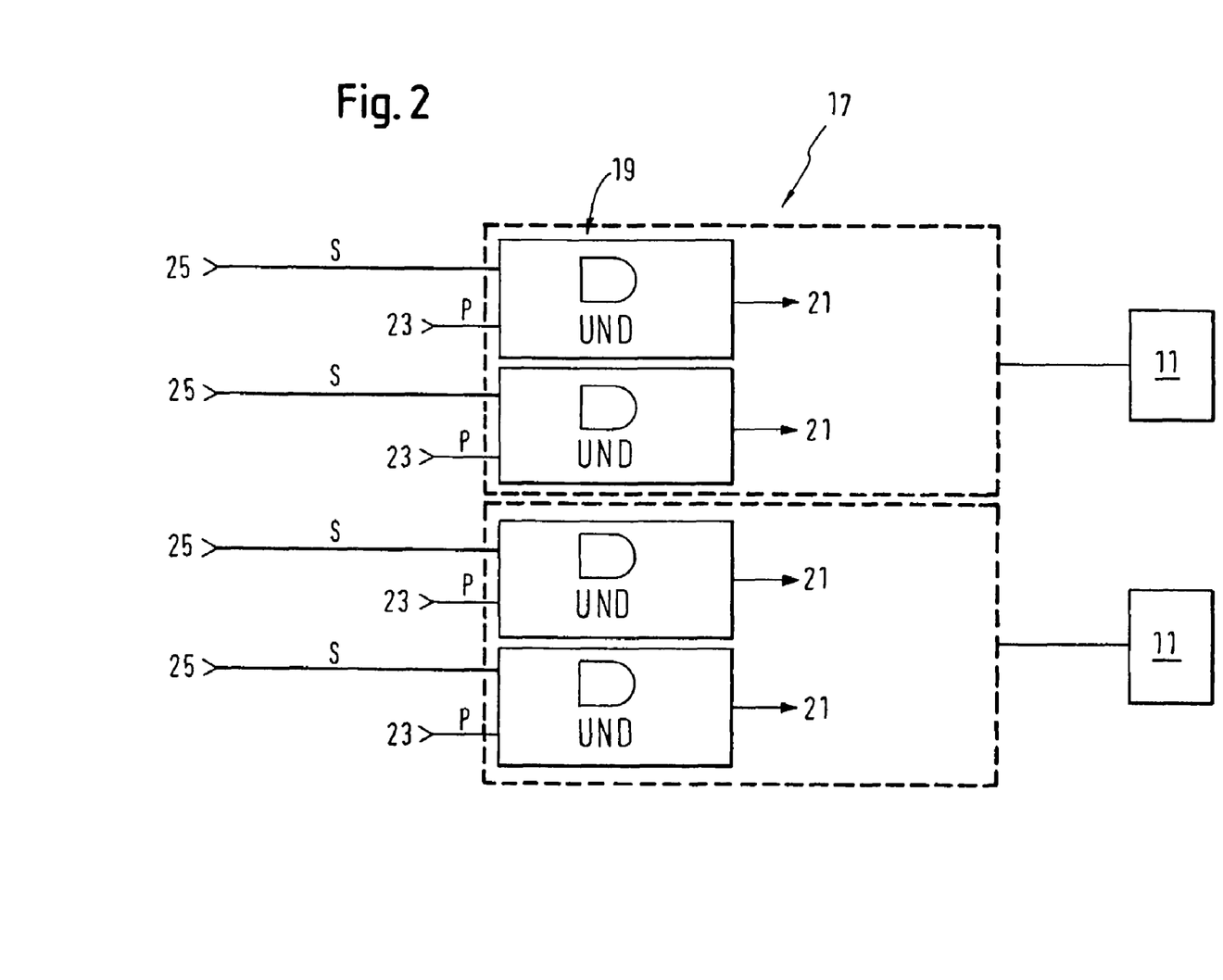
FIG. 2 shows schematically, a control unit in accordance with the invention being used in the system of FIG. 1.

FIG. 2 schematically shows the embedding of the logic module 19 of the control unit 17 into the process system. In the embodiment shown, a dual channel control is provided for each of the process devices 11 to be controlled, with the two channels each having an identical design. In each channel, the process data P supplied via a signal input 23 and the safety data S supplied via a safety input 25 are submitted to a logical AND link in the logic module 19 of the control unit 17. The corresponding local safety output 21 of the control unit 17 is controlled by the result of this logical link.

In this manner, a signal S of the process MPC 13 (FIG. 1) which is not directed to safety and which should act on the safe output 21 of the control unit 17, with a signal P of the safety MPC 15 which is directed to safety and which should act on the same safe output 21, is submitted to a logical AND link for each channel Since, in the embodiment described here, both the process signals S and the signals P directed to safety of the safety control 15 are transmitted to the control unit 17 via the industrial bus system 27, a safe bus protocol is used for the transmission of the safety signals S.

The logical AND link in the logic module 19 provides for the discrepant input patterns to result in safe outputs 21 remaining in the safe state, i.e. a continuous signal input manner of ones is required to switch the respective safe output 21.

Figure 3:
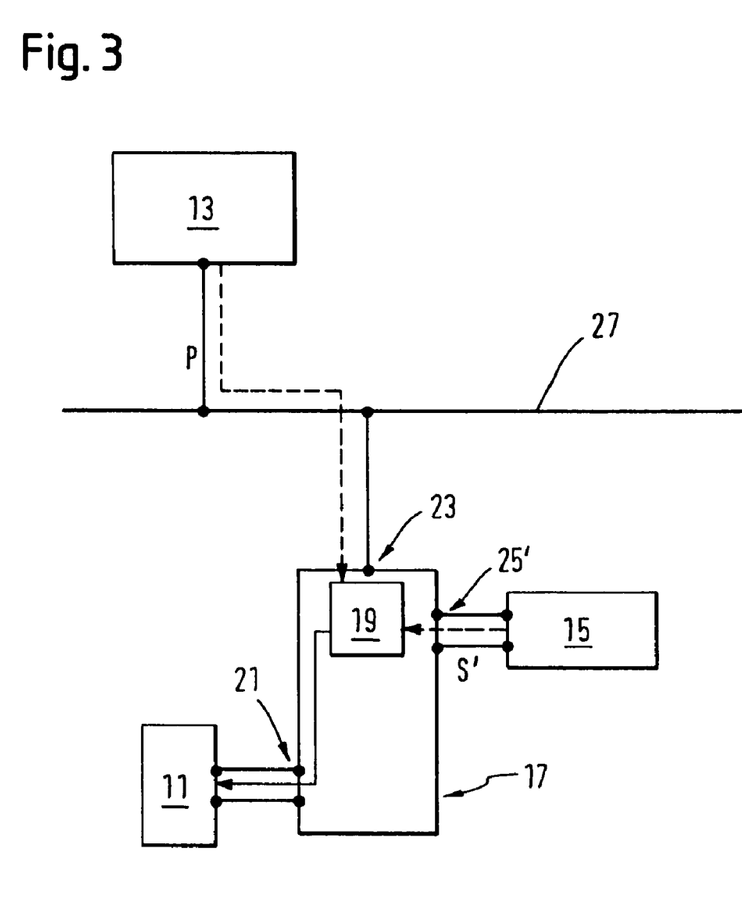
FIG. 3 shows schematically, a section from a process control system in accordance with the invention in a local variant.
Figure 4:
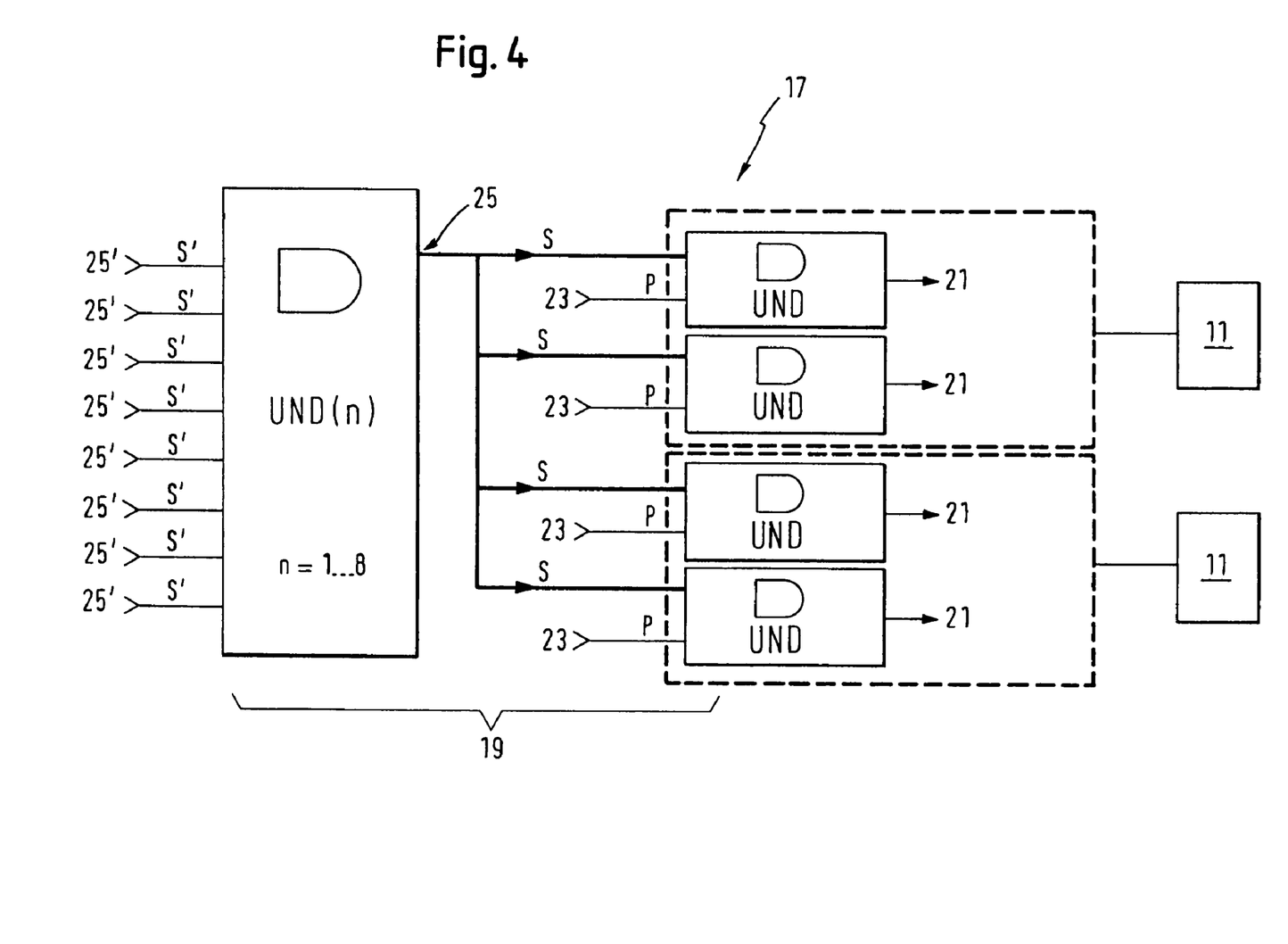
FIG. 4 shows schematically, a control unit in accordance with the invention being used in the system of FIG. 3.

With the local variant in accordance with the invention in accordance with FIGS. 3 and 4, unlike the remote variant explained above with reference to FIGS. 1 and 2, the safety module 15, which can be made as a safety sensor or as a safety MPC, is not connected to the control unit 17 via the field bus system 27, via which the safety MPC 13 communicates with the control unit 17, but the safety module 15 rather communicates directly with the control unit 17. The safety module 15 is arranged locally in the region of the control unit 17 and thus in the region of the process device 11 to be controlled.

In this local variant, any desired number of control units 17 can generally also be provided which each control one or more process devices 11 and to which the respective one or more safety modules 15 are connected.

In accordance with the invention, a mixed system design is generally also conceivable in which one or more local control units 17 receive safety signals S from a remote safety module 15 (corresponding to FIGS. 1 and 2; so-called RSR (remote safety release)) and one or more further control units 17 are each directly connected to one or more local safety modules 15 (corresponding to FIGS. 3 and 4; so-called LARS (local safety release)).

In the local variant, provision is made in the embodiment described here in accordance with FIG. 4 for the safety data S to be logically linked to the process data P to be made themselves from a plurality of safety signals S' which are provided by local safety modules 15 directly connected to the control unit 17. This formation of the safety signal S to be subsequently linked to the process signals P likewise takes place by the logic module 19, with the logical link also being designed as a logical AND link in this case. This logical linking can also take place in a separate logic module.

It is in turn ensured by this upstream AND link of the safety signals S' delivered from the safety devices 15 connected directly to the control unit 17 that discrepant input patterns have the consequence of safety outputs 21 of the control unit 17 remaining in the safe state.

Just like the signal processing, which links the resulting safety signal S to the process signals P for each of the process devices 11 connected to the control unit 11, the local signal inputs 25' of the control unit 17 are also designed as dual channels for the further increase of the safety. A dual channel evaluation of the incoming local safety signals S therefore takes place upstream of the actual logical signal processing including the process signals P in the control unit 17 or in its logic module 19, with the result of this upstream evaluation going into the following logical link.

The invention can generally be realized in all existing industrial bus systems, for example in the bus systems with the names Profibus, Interbus and DeviceNet and in Ethernet devices. The invention is moreover also suitable for all future mixed bus systems which permit a transmission both of process data and safety data.

The realization of the RSR function described above with reference to FIGS. 1 and 2 can, for example, be implemented for the bus systems DeviceNet and DeviceNet Safety. For this purpose, a standard DeviceNet connection is established for the exchange of the process data between the safety module also designated as the remote output module (target) and the process module also designated as the standard control (originator). The unsafe input data for the RSR function can be delivered via this connection by means of a so-called manufacturer-specific output assembly. Furthermore, a safe communication link is built up between the control unit and the safety MPC. The safe input data for the RSR function are transmitted via this communication link by means of an output assembly corresponding to the DeviceNet device profile.

The LSR function described in the above in connection with FIGS. 3 and 4 can also be implemented, for example, for the bus system DeviceNet. For this purpose, a standard DeviceNet link is in turn established to provide the exchange of the process data between the target (control unit) and the originator (process MPC). The unsafe input data for the LSR function can then be delivered via this connection by means of a manufacturer-specific output assembly. The safety signals required for the consent directed to safety are then generated by the safety sensors locally connected to the control unit.

REFERENCE NUMERAL LIST

11 process device, actuator
13 process module, process MPC
15 safety module, safety MPC
17 control unit, output module
19 logic module
21 control output of the control unit
23 signal input of the control unit
25, 25' signal input of the control unit
27 communication system, field bus system
P process signal of the process module
S, S' safety signal of the safety module The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for process control, wherein at least one process device to be controlled is controlled by at least one process module and at least one safety module, in that process signals (P) not relevant to safety are transmitted by the process module to a local control unit associated with the process device and safety signals (S) relating to the process safety are transmitted by the safety module, wherein the process signals (P) and the safety signals (S) are logically linked to one another in the control unit; and a result of the logical link is made available at a control output of the control unit to which the process device to be controlled is connected, wherein at least one safety signal (S), which is logically linked to the process signals (P), is itself formed by a logical link of safety signals (S') relating to the process safety.

2. A method for process control, wherein at least one process device to be controlled is controlled by at least one process module and at least one safety module, in that process signals (P) not relevant to safety are transmitted by the process module to a local control unit associated with the process device and safety signals (S) relating to the process safety are transmitted by the safety module, wherein the process signals (P) and the safety signals (S) are logically linked to one another in the control unit; and a the result of the logical link is made available at a control output of the control unit to which the process device to be controlled is connected, wherein the logical link is designed such that a discrepant signal pattern has a consequence of the control output remaining in a safe state.

3. A method for process control, wherein at least one process device to be controlled is controlled by at least one process module and at least one safety module, in that process signals (P) not relevant to safety are transmitted by the process module to a local control unit associated with the process device and safety signals (S) relating to a the process safety are transmitted by the safety module, wherein the process signals (P) and the safety signals (S) are logically linked to one another in the control unit; and a result of the logical link is made available at a control output of the control unit to which the process device to be controlled is connected, wherein the logical link between the process signals (P) and the safety signals (S) and/or between a plurality of safety signals (S') serving for forming of a resulting safety signal (S) is designed as a logical AND link.

4. A system for process control, comprising at least one process device to be controlled, at least one process module and at least one safety module, wherein the process device is connected to a control output of a local control unit associated with the process device;

the control unit has at least one signal input for process signals (P) of the process module not relevant to safety and for safety signals (S, S') of the safety module relating to a process safety; and the control unit includes at least one logic module which is connected between the signal input and the control output and in which the process signals (P) and the safety signals (S, S') can be logically linked to one another and by which a result of the logical link can be provided at the control output.

5. A system in accordance with claim 4, wherein at least the process module is connected to the control unit via a field bus system.

6. A system in accordance with claim 4, wherein at least the process module is connected to the control unit via at least one local signal input of the control unit.

7. A system in accordance with claim 4, wherein the process module and the safety module are arranged remote from the control unit and each other and are connected to the control unit via a common communication system, in particular a field bus system.

8. A system in accordance with claim 4, wherein the process module is arranged remote from the control unit and is connected to the control unit via a central communication system, in particular a field bus system, and the safety module is arranged locally in a region of the control unit and in particular is arranged remote from the process module and is directly connected to the control unit.

9. A system in accordance with claim 4, wherein the safety module includes a safety control, in particular in a form of a Memory Programmable Control.

10. A system in accordance with claim 4, wherein the safety module includes at least one safety sensor.

11. A system in accordance with claim 4, wherein the control unit includes a plurality of safety inputs for safety signals (S') which can be logically linked to one another to form a resulting safety signal by means of the logic module, wherein the resulting safety signal (S) can in turn be linked to the process signals (P) by means of the logic module.

12. A system in accordance with claim 4, wherein a plurality of channels, in particular two channels, are provided for at least one process device, in particular for every process device, in the control unit, with a respective logical linking of process signals (P) and safety signals (S, S') being able to be respectively carried out in said channels.

13. A system in accordance with claim 4, wherein a voltage supply for the control output is separate from a logical signal path and/or from the voltage supply of the process device to permit a safe stopping of the control output.

14. A system in accordance with claim 4, wherein the at least one process device to be controlled is controlled by the at least one process module and at the least one safety module, in that the process signals (P) not relevant to safety are transmitted by the process module to the local control unit associated with the process device and the safety signals (S) relating to the process safety are transmitted by the safety module; and wherein the process signals (P) and the safety signals (S) are logically linked to one another in the control unit; and the result of the logical link is made available at the control output of the control unit to which the process device to be controlled is connected.

15. A system in accordance with claim 14, wherein the process module and the safety module are arranged remote from the control unit and are connected to the control unit via a common communication system, in particular a field bus system.

16. A system in accordance with claim 14, wherein the process module is arranged remote from the control unit and is connected to the control unit via a central communication system, comprising a field bus system, and the safety module is arranged locally in the region of the control unit and is arranged remote from the process module and is directly connected to the control unit.

17. A system in accordance with claim 14, wherein the control unit includes a plurality of safety inputs for safety signals (S') which can be logically linked to one another to form a resulting safety signal by means of the logic module, wherein the resulting safety signal (S) can in turn be linked to the process signals (P) by means of the logic module.

* * * * *